US006817108B2

(12) United States Patent
Eaton

(10) Patent No.: US 6,817,108 B2
(45) Date of Patent: Nov. 16, 2004

(54) ARTICULATION MEASURING ARM HAVING ROTATABLE PART-CARRYING PLATEN

(76) Inventor: Homer L. Eaton, Suite 108A, #347 300 CVD, Carlsbad, CA (US) 92008

( * ) Notice: Subject to any disclaimer, the term of this patent is extended or adjusted under 35 U.S.C. 154(b) by 51 days.

(21) Appl. No.: 10/361,126

(22) Filed: Feb. 5, 2003

(65) Prior Publication Data

US 2004/0148791 A1 Aug. 5, 2004

(51) Int. Cl.[7] .............................................. G01B 5/25
(52) U.S. Cl. ........................................ 33/503; 33/569
(58) Field of Search ........................ 33/503, 568, 569, 33/570, 573, 549, 550, 551, 553, 554; 269/55, 56, 57

(56) References Cited

U.S. PATENT DOCUMENTS

| 2,676,414 | A | * | 4/1954 | Derry | 33/534 |
| 3,785,634 | A | * | 1/1974 | Denker | 33/568 |
| 4,080,741 | A | * | 3/1978 | Siddall et al. | 33/502 |
| 4,369,581 | A | * | 1/1983 | Lenz | 33/1 M |
| 5,396,712 | A | * | 3/1995 | Herzog | 33/503 |
| 5,829,148 | A | * | 11/1998 | Eaton | 33/503 |

* cited by examiner

Primary Examiner—Christopher W. Fulton
(74) Attorney, Agent, or Firm—Henri J. A. Charmasson; John D. Buchaca

(57) ABSTRACT

In a spatial coordinate measurement system using an articulated arm and associated electronic data processor, the workpiece having locations to be measured is held by a carrier rotatively supported about an axis. An angular encoder feeds into the processor the relative orientation of the carrier about the axis. The processor virtually translates the origin or point of reference of the arm as a function of the orientation of the carrier so that the carrier and workpiece can be rotated to place the location to be measured in close proximity to the sensing probe of the arm without affecting the relative coordinate measurement. The extent of movement of the arm around the workpiece that would be necessary if the piece remained stationary throughout measurements of all locations, is substantially reduced.

15 Claims, 3 Drawing Sheets

FIG. 1

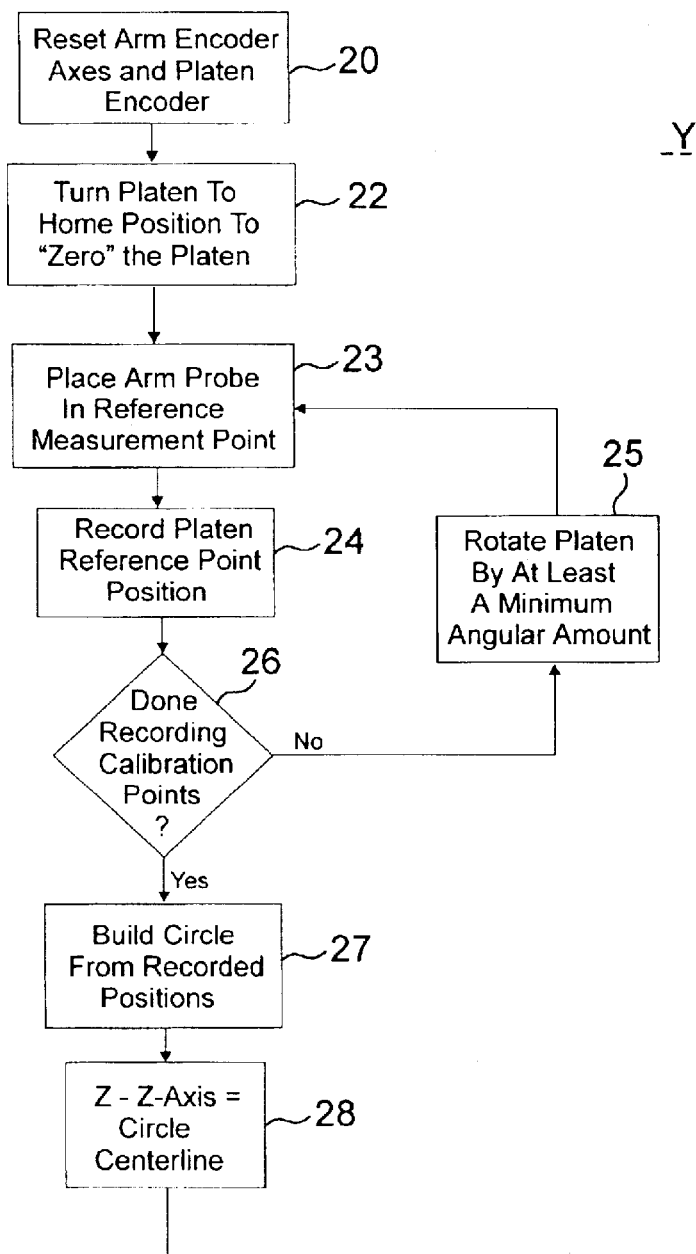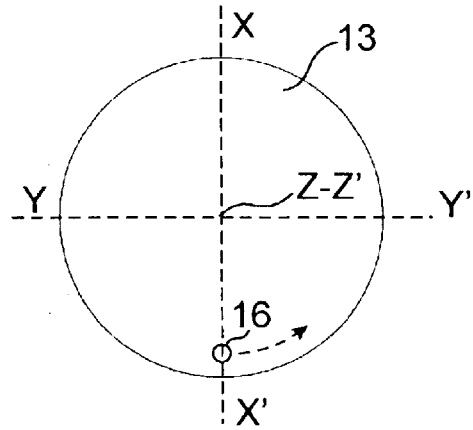
FIG. 3
FIG. 4

ARTICULATION MEASURING ARM HAVING ROTATABLE PART-CARRYING PLATEN

FIELD OF THE INVENTION

This invention relates to measuring devices, and more particularly to articulated spatial coordinate measuring machines as specifically disclosed in my U.S. Pat. No. 5,829,148, which patent is incorporated in this specification by this reference.

BACKGROUND OF THE INVENTION

Spatial coordinate measurement machines having a probe mounted at the end of an articulated, multi-sectional arm are extremely versatile and offer a great deal of flexibility for ascertaining the precise spatial coordinates of a plurality of locations dispersed about a workpiece or other body. The multiple articulations, typically four or more, of the arm allows the user to work around obstacles when positioning the probe on hard-to-reach locations. However, as the number of articulations and rotational axes are increased, the accuracy of the measurements are affected by the tolerance margin introduced by each articulation and its associated angular encoder. While the reaching ability of contemporary spatial measurement arms has been improved by increasing their freedom of movement about up to seven axes of rotation, a substantial loss of accuracy and reliability has been experienced.

When measuring locations around a workpiece that is relatively bulky compared to the size of the measurement arm, it becomes necessary to move the arm and its reference base to a different location so that all points to be measured can be conveniently reached. Each displacement of the measurement arm requires a readjustment of its reference point. The very measurement of the amount of displacement can introduce additional errors.

This invention results from an attempt to palliate loss of accuracy resulting from the multiplication of arm sections and rotational axes and to limit the size and number of required displacements of the measurement arm around a bulky workpiece.

SUMMARY OF THE INVENTION

The principal and secondary objects of this invention are to increase the range of a spatial measurement arm as well as limiting the degrees of motion necessary to reach all measurable locations on a workpiece while decreasing the required degree of travel of each arm section during a series of spatial coordinate measurements.

These and other valuable objects are achieved by a spatial coordinate measurement system which combines an articulated device mounting a measurement probe at the end of a multi-sectional arm, an electronic data processor and a rotatable workpiece carrier whose angular position around an adjustably positionable axis is indicated by an angular encoder. The electronic data processor uses the output of the angular encoder to translate, not physically but virtually, the origin or reference point of the spatial measurement device. Accordingly, the carrier and the workpiece can be conveniently rotated to place any situs to be measured within a short reach from the measurement device probe.

The position of the carrier and of its axis of rotation can be indiscriminatly set allowing for maximum flexibility of movement of the workpiece. These positions are entered into the system by first measuring the spatial location of a reference locus, preferably marked on the carrier, at three or more different angular orientations. A program in the electronic data processor uses the results of those three or more measurements to establish the exact orientation and position of the axis which are taken into account during all successive measurements regardless of the rotational orientation of the carrier. That rotational orientation is monitored by another program routine in the electronic data processor and used to virtually translate the coordinate location of the measurement device origin. As the carrier and workpiece are rotated, the measurement device and its origin appears to rotate around the same axis and in the same degree of circular travel. The carrier and workpiece rotational information is also fed to the Computer Assisted Drawing (CAD) system which is part of the electronic data processor so that the monitor displays a corresponding rotational movement of the workpiece representation.

BRIEF DESCRIPTION OF THE DRAWING

FIG. 3 is a diagrammatical illustration of the platen movement;

FIG. 4 is a flow diagram of the carrier referencing process;

DESCRIPTION OF THE PREFERRED EMBODIMENT OF THE INVENTION

Figure 1:
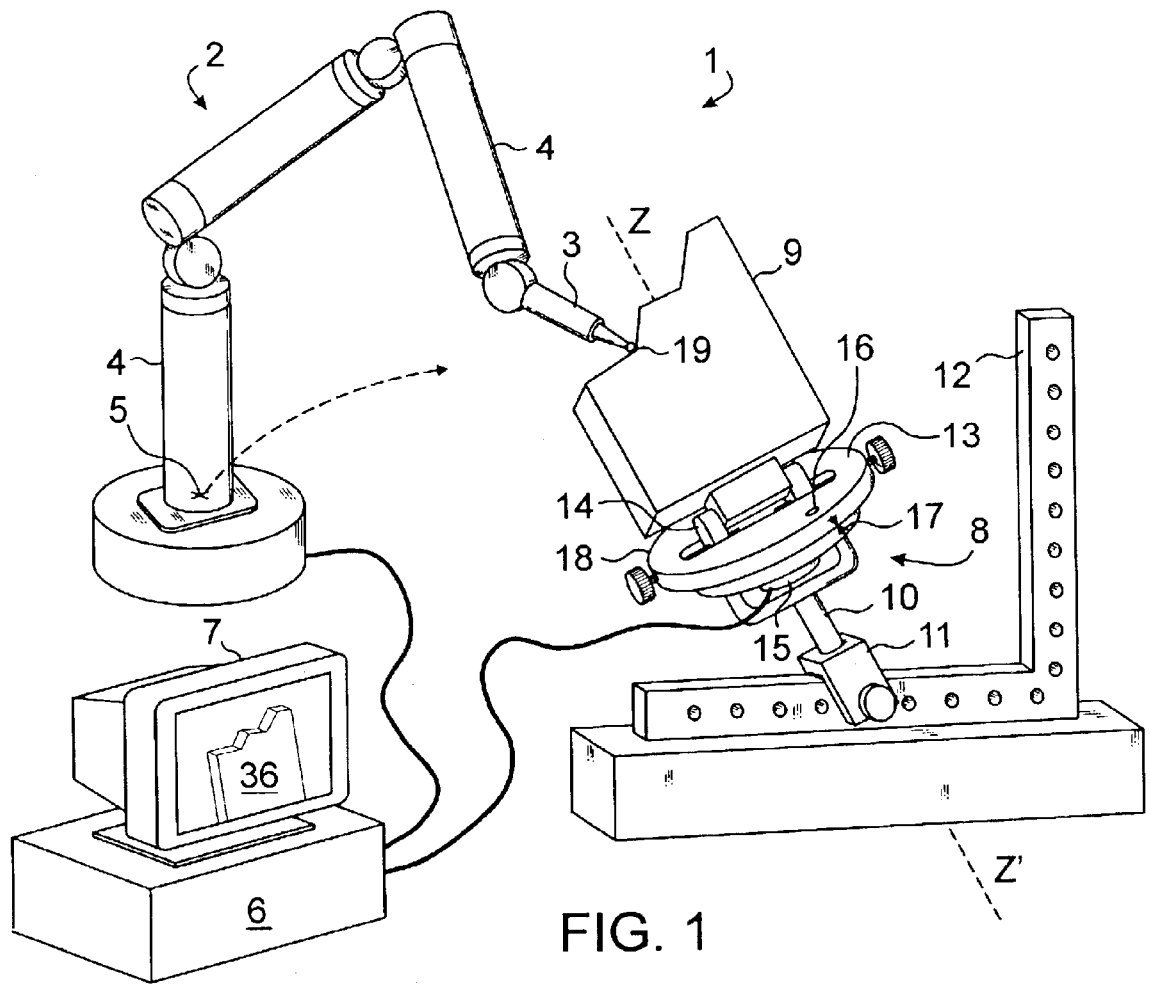
FIG. 1 is a perspective view of the spatial measurement system according to the invention.

Referring now to the drawing, there is shown in FIG. 1, a spatial coordinate measurement system 1 of the type disclosed in the referenced patent. The system includes an articulated measurement device 2 mounting a probe 3 at the end of an articulated arm 4. All measurements derived from the position of the probe tip are first referenced to the point of origin 5 located in the center of the device base. The system further comprises an electronic data processor 6 and its associated video monitor 7. The processor receives signals from the device indicative of the spatial coordinates at the tip 19 of the probe in reference to the point of origin 5. Associated with the processor 6 is a workpiece carrier 8 which is shaped and dimensioned to hold a workpiece 9 having a plurality of locations whose coordinates are to be measured by the system. The carrier is rotatively supported around an axis Z–Z' by a leg 10 which can be clamped at its root 11 to a plurality of locations and at diverse angles along a L-shaped framework 12. Accordingly, the position and orientation of the axis Z–Z' can be adjusted to allow rotation of the workpiece in a variety of directions.

Figure 2:
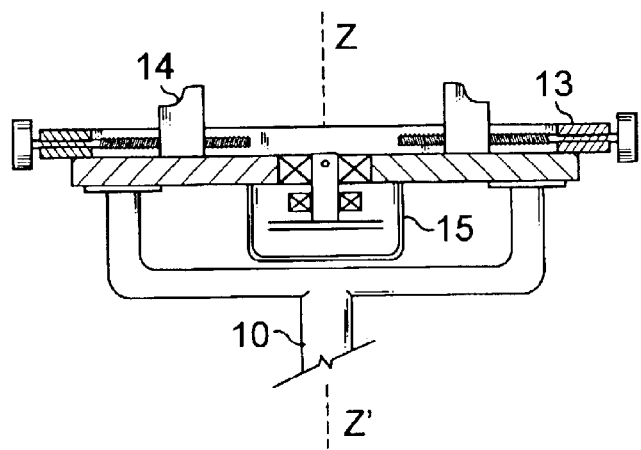
FIG. 2 is a cross-sectional view of the carrier platen assembly.

As more specifically illustrated in FIG. 2, the workpiece is held over a platen 13 by a clamping mechanism 14. An optical angular encoder 15 provides a signal indicative of the angular position and movement of the platen about the axis Z–Z' to the electronic data processor 6. It should be understood that the combination of the rotating platen and encoder is an obvious equivalent to an electronically indexed rotary table, a servo-rotary indexer and other such positioning devices well-known to those skilled in the electromechanical arts.

The processor 6 includes a program that uses the signal representing the angular position of the carrier and workpiece around axis Z–Z' to virtually translate the origin or reference point 5 in a circular path about axis Z–Z' and in an are corresponding to the rotating movement of the workpiece. Accordingly, the carrier and workpiece can be rotated between two measurements without affecting the spatial coordinate of the measured locations.

After each changement in the position and orientation of the carrier and those of axis Z–Z', it is necessary to calibrate the system in accordance with the following process illustrated in FIGS. 3 and 4.

A locus 16 preferably in the form of a conic detent is marked on the upper surface of the platen 13 near its peripheral edge 18. After resetting 20, the spatial coordinate arm device 4 and the platen angular encoder 15, the platen is rotated 22 until the reference point 16 lines up with a home position pointer 17. At this position, the platen is zeroed, i.e., the locus 16 lines up with the X–X' axis of the encoder and is roughly 90° away from its Y–Y' axis. The tip 19 of the arm is then placed 23 on the locus 16. The spatial position of the locus is measured and recorded 24 as a calibration point. The platen is then rotated 25 and the new position of measurement point is then measured and recorded 23, 24. The platen moving and reference point recording process is repeated at least one or more times 26 before the position and orientation of the Z—Z' axis is calculated.

Theoretically, the more calibration points taken, the more accurate the calibration. However, tradeoffs typically come into play, the longer it takes to measure the calibration points due, for example, to thermal expansion caused by minute temperature fluctuations. Therefore, it has been found that at least two additional calibration points should be taken after the "zero" point. However, a small number of additional points may be preferable in some circumstances.

Further, in order to minimize error, the location of the points should be well spaced apart around the circle of possible points. One way to accomplish this is to require the rotation in degrees between successive points to be greater than 360/N where N is the number of calibration points including the zone point.

In the present embodiment, for clarity only, three additional calibration points are taken after the zero point. In this case, the platen should be rotated at least 90° between measurements.

A program routine in the electronic data processor 6 then builds a circle 27 from the three or more recorded positions of the locus 16 of which the Z–Z' axis is first determined 28. The X–X' and Y–Y' axes of the plane containing the three or more recorded positions are then determined 29, 30, and finally the center point of the center is obtained 31. From this calculation, a complete reference for the platen is obtained 32 including the orientation of the Z–Z' axis and the axes' cross-point where it meets the aforesaid plane.

Figure 5:
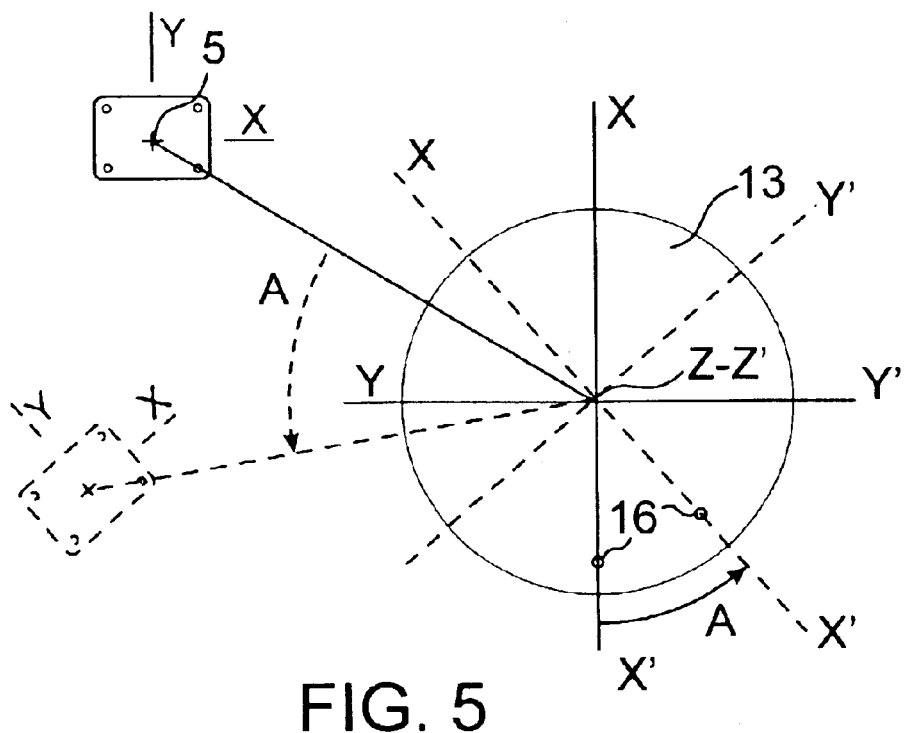
FIG. 5 is a diagrammatical illustration of the arm origin virtual translation.
Figure 6:
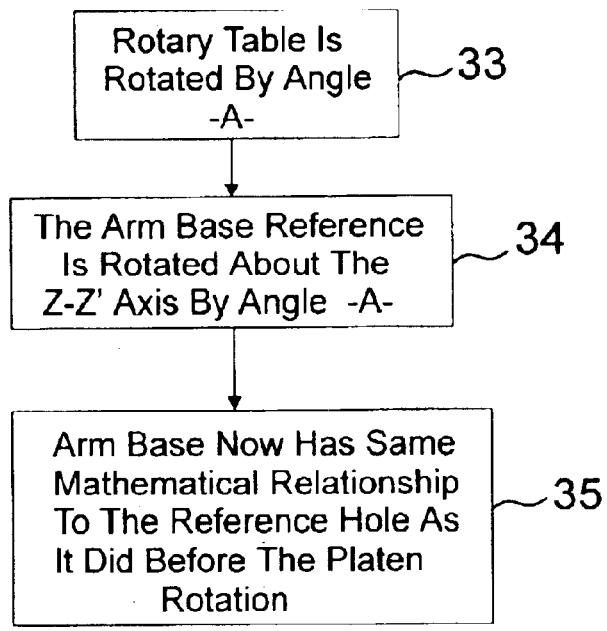
FIG. 6 is a flow diagram of the measuring device reference point translation process.

As illustrated in FIGS. 5 and 6, when the platen 13 and workpiece 9 are rotated 33 by a given angle A, the arm base reference 5 is also rotated about the Z–Z' axis by the same angle A until the arm reference point has the same relationship to the locus 16 as it did before the rotation. Consequently, the probe at the end of the measurement arm gives the same coordinate values for the locus 16 or any other location on the workpiece before and after the rotational movement.

Feeding the rotational movement data generated by the encoder 15 in lieu of the mouse input into the electronic data processor 6 will cause the image 36 of the workpiece appearing on the monitor 7 to rotate and present to view the area of the workpiece upon which measurements are being taken.

It should be noted that if an indexing table is used in lieu of the platen 13 and its angular encoder 15, the rotation signal is preferably generated by the electronic data processor 6 in response to keyboard or mouse entry. The angular driving signal to the indexing table is used in lieu of the angular encoder output signal to calculate the translating movement of the arm reference point 5.

While the preferred embodiments of the invention have been described, modifications can be made and other embodiments may be devised without departing from the spirit of the invention and the scope of the appended claims.

What is claimed is:

1. A spatial measurement system which comprises:
   a stationary articulated measuring probe referenced to a first point;
   a workpiece carrier rotatively supported about a first axis passing though a second point;
   said first axis being adjustably orientable;
   means for generating a signal representative of the adjusted angular orientation of said carrier about said first axis; and
   means responsive to said signal for virtually translating said first point circularly around said second point and about said first axis.

2. The system of claim 1, wherein said means for generating a signal comprise an optical encoder.

3. The system of claim 1, wherein said means for virtually translating comprise program means in said electronic date processor, for determining the position and orientation of said axis in response to three successive spatial measurements of a locus on said carrier at different rotational positions about said first axis.

4. The system of claim 3, wherein said carrier further comprises means for changing the position and orientation of said first axis.

5. The system of claim 3, wherein said carrier comprises a platen having said locus point.

6. In a spatial coordinate measurement apparatus comprising in association an articulated arm referenced to a point of origin and an electronic data processor, an improvement for reducing the required travel of the arm around a workpiece, said improvement comprising:
   a carrier shaped and dimensioned to hold said workpiece, said carrier being rotatively supported about an adjustably orientable axis;
   an angular orientation sensor associated with said carrier and positioned to provide said electronic data processor with an indication of the rotational position of said carrier and workpiece about said axis; and
   program means in said electronic data processor responsive to said indication, to virtually translate said point of origin around said axis;
   whereby the relative coordinate measurements of locations on said workpiece are not affected by rotation movements of said carrier and workpiece between said measurements.

7. The improvement of claim 6, wherein said electronic data processor further comprises program means for processing at least three successive measurements of at least three positions of said reference point.

8. The improvement of claim 7, wherein said carrier comprises a platen having a reference measurement point.

9. The improvement of claim 8, wherein said electronic data processor further comprises program means responsive to said successive measurements for determining the position and orientation of said axis.

10. The improvement of claim 1, wherein said angular orientation sensor comprises an optical encoder.

11. A method for ascertaining the spatial coordinates of a plurality of locations on a body in reference to a point of origin by means of a spatial measurement probe irrespective of the rotational orientation of said body, said method comprising:

securing said body on a carrier rotatively supported about an axis having adjustable position and orientation;

adjusting said position and orientation for maximum flexibility of movement of the body in relation to the probe;

measuring the coordinates of a first location on said workpiece rotating said carrier about said axis by a given angle;

calculating a virtual, circularly-translated position for said point of origin about said axis as a function of said given angle;

rotating said carrier and body about said axis to place at least a location to be measured within reach of said probe; and referencing a subsequent measurement of location coordinates on said body to said translated position.

12. The method of claim 11, wherein said measuring comprises determining the position and orientation of said axis.

13. The method of claim 12, wherein said determining comprises performing at least three spatial measurements of a locus on said carrier at different angular positions of said carrier about said axis to obtain at least three spatial sets of coordinates;

using said sets to determine the plane and circle traveled by said locus and a point equidistant from said sets at which said axis orthogonally meets said plane.

14. The improvement of claim 12 which further comprises operating a computer assisted drawing program and feeding into said program said angular orientation;

whereby an image of the workpiece displayed by said program is rotated in proportion to the rotation of said carrier.

15. In the measurement of the spatial coordinate of a plurality of points dispersed over a workpiece in reference to an origin by means of an articulated spatial measurement arm device and associated electronic data processor, an improvement for reducing the need to displace said arm around said workpiece, said improvement comprising:

mounting said workpiece on a carrier rotatably supported around an adjustable axis;

adjusting the position and orientation of said axis for maximum flexibility of movement of the body in relation to the probe;

entering into said electronic data electronic data processor the spatial location and orientation of said axis;

entering into said electronic data processor the angular orientation of said carrier about said axis in reference to a home position; and virtually translating the location of said origin circularly around said axis as a function of said angular orientation.

* * * * *